June 4, 1968   J. H. CARPENTER ET AL   3,387,243
INDUCTIVE DISK WINDING WITH IMPROVED IMPULSE VOLTAGE GRADIENT
Filed March 30, 1966
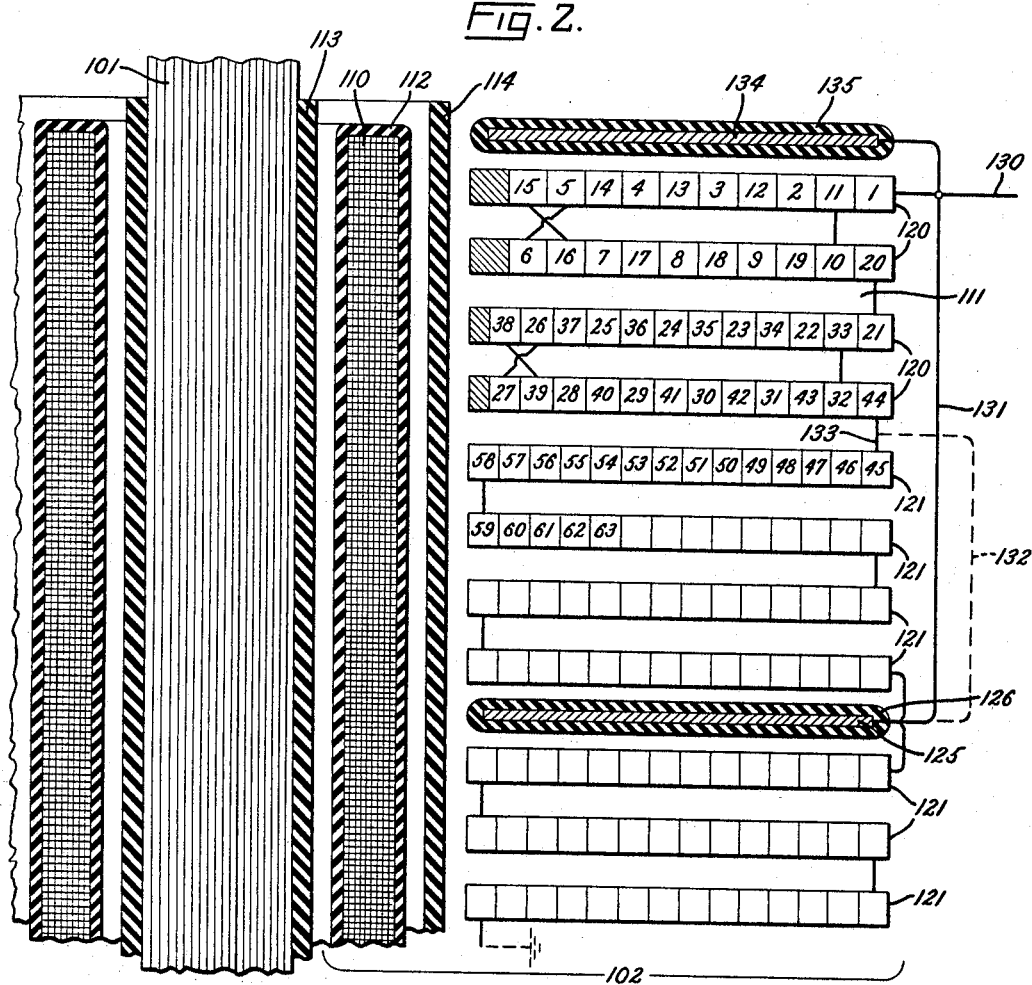
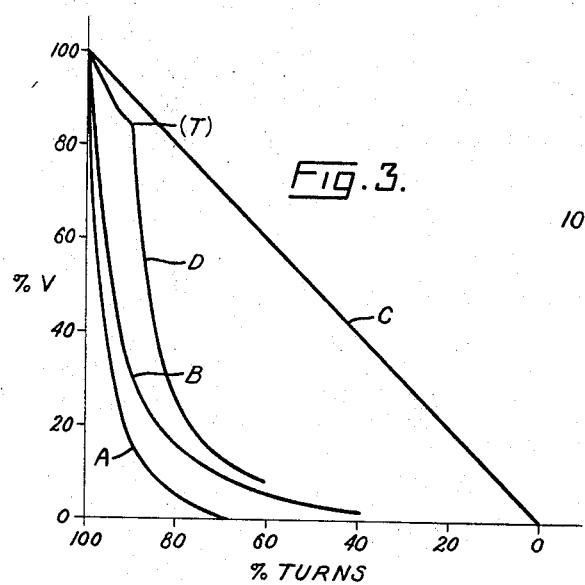
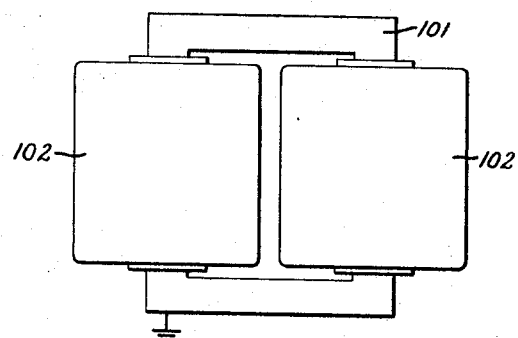
INVENTORS:
JONATHAN H. CARPENTER,
TOM D. HOLDER,
BY J. Wesley Hauber
ATTORNEY

United States Patent Office 3,387,243
Patented June 4, 1968

3,387,243
INDUCTIVE DISK WINDING WITH IMPROVED IMPULSE VOLTAGE GRADIENT
Jonathan H. Carpenter and Tom D. Holder, Rome, Ga., assignors to General Electric Company, a corporation of New York
Filed Mar. 30, 1966, Ser. No. 538,842
10 Claims. (Cl. 336—70)

ABSTRACT OF THE DISCLOSURE

A high voltage disk-type transformer winding in which impulse voltage distribution is improved by interlacing of coils at only a high voltage end portion and interposing an inter-coil static plate at a point near the transition to a non-interlaced coil section, the plate being electrically connected to the line terminal or other point higher in potential than the coils at the transition point.

---

Our invention relates to windings for electric induction apparatus such as transformers, reactors and the like. The invention is directed particularly to means for improving voltage distribution throughout a high voltage winding and reducing the insulation stresses created by application of steep wave impulse voltages such as lightning and switching surges.

It is well known that highly inductive windings such as iron core transformer and reactor windings, when exposed to steep wave front impulse or transient voltages, exhibit initially an exponential distribution of voltage drop along the length of the windings with a very high voltage gradient at the first few turns. For example, approximately 60% of the voltage may appear across the first 5% of the turns of the winding at the high voltage end. This extremely non-uniform distribution of voltage is due primarily to the unavoidable distributed capacitance between each incremental part of the winding and adjacent grounded parts such as core and casing structure. Such ground capacitance is referred to as "parallel" capacitance when the low voltage end of the winding is grounded in the usual manner. Such a winding inherently possesses also a distributed capacitance between turn or winding sections, the sum of such capacitance being in series between the winding terminals. If this "series" capacitance alone were present, voltage distribution throughout the winding would be substantially uniform and linear, as it would be also if inductance alone were present. However, since distributed capacitance, both series and parallel, is an inherent winding characteristic, voltage distribution in the presence of impulse voltages, such as lightning or switching surges, is a design consideration of importance.

One common type of high voltage winding for transformers and reactors is the disk winding wherein each of a plurality of annular coils is wound as a radial spiral, the coils being disposed coaxially on the core and connected electrically in series circuit relation. In a transformer having such a disk winding, the low voltage winding is commonly immediately adjacent the core and is surrounded by the higher voltage disk winding. Relative to the high voltage winding the entire low voltage winding is at approximately ground potential and the radial space between them, called the "main gap," is an essential design parameter. The length of the main gap is determined primarily by two considerations. One is the maximum permissible voltage stress across the gap at power frequency; the other is the voltage stress between adjacent annular coils upon the occurrence of high frequency transient voltages. In practice the latter consideration usually controls the size of the main gap in disk type transformers. The non-linearity of the coil-to-coil voltage stress usually requires that the first several coils at the high voltage end of a disk winding be provided with extra insulation. For reasons of size and economy, it is desirable to reduce the size of the main gap and to reduce the amount of insulation between winding coils and coil turns. All these results may be accomplished if the normally steep exponential voltage distribution can be favorably modified, especially at the high voltage end or ends of the winding, and brought closer to the ideal uniform linear distribution.

Means are known for improving impulse voltage distribution in high voltage windings. Usually such means include additional series capacitance in conjunction with the winding to overcome the effect of the parallel capacitance. In disk type windings one desirable means for adding series capacitance is by winding the several coils or pairs of coils each of a plurality of physical interleaved spiral conductors electrically connected in series circuit relation, as illustrated in Patent 2,453,552, Stearn. Such interleaved winding, or interlacing, can be used if desired throughout only an initial portion of the winding at the high voltage end, but to do so is not ordinarily desirable because of the high voltage gradient created at the point of transition between interlaced and non-interlaced coils. Since interlacing of coils is a quite expensive manufacturing procedure, it may be uneconomical to interlace an entire winding.

Accordingly it is a general object of our invention to provide improved means for reducing impulse voltage gradients at the high voltage end or ends of an inductive winding in electrical apparatus.

It is another object of our invention to provide means for improving impulse voltage distribution in a high voltage disk type winding without requiring special modification of the entire winding.

A more particular object of our invention is to reduce impulse voltage gradients at the high voltage end or ends of a disk type inductive winding without creating undesirably high voltage gradients at the transition point between the high voltage end and the remainder of the winding.

A further object of our invention is to provide means for eliminating high impulse voltage gradients between interlaced and non-interlaced portions of a disk type winding.

It will be understood by those skilled in the art that in referring to the high voltage end or ends of a winding, we mean to identify the so-called "line" terminal portions as distinguished from grounded or neutral voltage portions. Thus a winding grounded at one end has only one high voltage line terminal, while if grounded at an intermediate point, it may have two line voltage ends. Similarly, delta connected windings have high voltage terminals at both ends relative to a lower voltage center point. Our invention is equally applicable to all such high voltage winding ends.

In carrying out our invention in one preferred embodiment, we provide a high voltage disk type winding in which a selected group of spirally wound annular coils at each high voltage end portion of the winding is formed of a plurality of radially interleaved spiral conductors while the remaining coils in the lower voltage portion of the winding are each formed of single spiral conductors in non-interlaced fashion. All the coils are connected in series circuit relation, with the several spiral conductors of each interlaced coil preferably being electrically separated in the series circuit by one or more such conductors in adjacent interlaced coils. At or near the point of transition between the interlaced group of coils and an adjacent non-interlaced group there is interposed between coils an annular conductive static plate connected electrically to a higher voltage portion of the winding than that at which the plate is inserted. Such an intermediate static plate may, for example, be connected to the high voltage line terminal or to an intermediate or end point in the interlaced high voltage portion of the winding. Preferably, also, a similar annular conductive static plate is positioned at the high voltage end of the winding in axial spaced relation with the end coil and electrically connected to the high voltage terminal.

Our invention itself will be more readily understood and further objects and advantages more fully appreciated by referring now to the following detailed specification taken in conjunction with the accompanying drawing in which:

FIG. 1 is a general side elevational view of an electric induction apparatus to which our invention is applicable:

FIG. 2 is a fragmentary cross-sectional view of an electric transformer having a high voltage disk-type winding embodying our invention and FIG. 3 is a diagrammatic illustration of impulse voltage distribution characteristics of several different types of high voltage transformer windings, including a winding embodying our invention.

Referring now to the drawing, we have shown at FIG. 1 a core type electric induction apparatus having a rectangular magnetic core 101 including a pair of parallel side legs upon each of which are mounted current conducting windings indicated generally by the reference numeral 102. As shown in greater detail at FIG. 2, each winding 102 in the case of a typical core type transformer comprises a low voltage primary winding 110 of tubular configuration closely surrounding the core 101 and a high voltage secondary winding 111 of the disk type concentrically surrounding the low voltage winding. The low voltage winding 110 is encased in a suitable insulating sheath 112, and the space between that winding and the core 101 is filled at least partially by a tubular insulating spacer 113. The radial space between the low voltage winding 110 and the high voltage winding 111 is referred to as the transformer main gap, and a tubular insulating sleeve 114 is provided in this space.

It will be understood as the description proceeds that while we have shown for the purpose of illustration a core type transformer having a primary winding section and a secondary winding section on each of two side legs, our invention is equally applicable to shell-type transformers and to reactors or other apparatus including high voltage inductive windings whether of the single phase or multi-phase type. Our invention itself concerns more particularly the structure and configuration of the high voltage winding. In the case illustrated the invention concerns the high voltage secondary winding 111 of the transformer. Reference will be had hereinafter, therefore, more particularly to the fragmentary cross-sectional view of FIG. 2. It will be understood that at FIG. 2 there is illustrated only a high voltage end portion of the secondary winding 111, and that the remainder of the winding continues through as many additional annular coils as may be desired in accordance with the voltage rating, with the lower voltage end of the winding connected to ground and thus to the grounded transformer core 101. It will be further understood that if the winding be of the balanced type with both ends connected to high voltage line conductors and an intermediate or central point at lower voltage (such as ground or the like), the fragmentary view at FIG. 2 illustrates a suitable construction for each high voltage end of the winding.

Referring now more particularly to FIG. 2, the disk type high voltage winding 111 comprises a plurality of annular sections or coils 120 and 121, each wound of one or more radially superposed spiral conductors with the coils coaxially disposed on the core 101 and connected in series circuit relation. As illustrated, the spiral conductors forming the coils 120 are each of rectangular cross-section, and it will be understood that suitable turn-to-turn insulation is provided, as by coating the conductor with suitable insulating varnish or other resinous insulating material or paper. Each single annular group of conductors is herein referred to as a coil. All the coils are wound in the same rotational direction, but in order to simplify the series corssovers from one coil to the other, it is preferable to wind the coils alternately radially inward and radially outward. Wherever adjacent pairs of oppositely wound coils are formed of several interleaved spiral conductors such conductors are preferably cross-connected in the series circuit, as will be more fully evident hereinafter.

In a disk-type high voltage winding embodying our invention the first several coils 120 at the high voltage or line end of the winding are each formed of a plurality of radially interleaved or interlaced conductors, while the remaining coils 121 are wound each formed of a single non-interlaced spiral conductor. In this manner the coils are divided into two groups, the interlaced groups of coils 120 at the line end of the winding having greater series capacitance per coil than does the non-interlaced group of coils 121.

In the illustrated example we have shown the first four coils 120 at the high voltage end of the winding 111 wound in interlaced fashion with the several conductors of each oppositely wound pair cross connected in alternate series circuit relation, as indicated by the numerical turn sequence shown on the drawing. The remaining coils 121 between the innermost interlaced coil and the low voltage winding terminal are formed of single spiral conductors and connected directly in series as indicated by the numerical turn sequence shown on the drawing. Each interlaced coil may conveniently be formed of a plurality of conductors (two being used for the purpose of illustration) wound together in parallel juxtaposition so that the turns of each are radially interposed between the turns of the other. Thus in the first end coil 120 the turns 1-2-3-4-5 constitute one spiral conductor while the turns 11-12-13-14-15 constitute the other conductor of a single interlaced coil. As will be evident from the numercial sequence, this first end coil is wound spirally inwardly while the next adjacent coil is would spirally outwardly. In the second coil a conductor 6-7-8-9-10 is interlaced with a conductor 16-17-18-19-20. The four conductors of these two first coils are cross-connected in alternate series circuit relation before the series circuit advances to the second oppositely wound pair of coils. Specifically the series circuit proceeds from the conductor 1-5 in the first coil to the conductor 6-10 in the second coil, then to the conductor 11-15 in the first coil, and back to the conductor 16-20 in the second coil. The series circuit thereafter proceeds in similar manner through the next pair of oppositely wound interlaced coils.

In describing a type of disk coil interlacing applicable to our invention, we have chosen to illustrate two interlaced conductors in each coil with alternate series connection of the several conductors in two adjacent oppositely wound coils. It will, of course, be understood by those skilled in the art that if desired, more than two interlaced conductors may be used in each coil and that the series connection of the interlaced conductors may be made in a variety of sequences. Preferably where $n$ conductors are used in a single coil a group of $n$ coils is connected as a series set by advancing first through one conductor in each of the coils in direct or other predetermined sequence and then returning $n$ times to advance again through another conductor of each coil in the same sequence. In another possible sequence, each coil may be traversed $n$ times before proceeding to the next coil. As a further variation, it is possible, if desired, to interlace only a portion of the turns in each coil of the interlaced group with the remaining turns in each coil not interlaced.

By interlacing the coil conductors in a first high voltage end portion of the winding 111, as described above, the series capacitance of this portion of the winding is so increased that voltage distribution throughout this portion of the winding approaches the ideal uniformity which would exist if the winding consisted of pure inductance. However, the fact that interlacing is discontinued at some interior point of transition to a non-interlaced group of coils creates an abrupt change in the impulse voltage distribution characteristic at this point. Such a point of transition is ordinarily characterized by undesirably steep impulse voltage gradient. In order to partially overcome this effect and in order to improve the coil-to-coil and turn-to-turn impulse voltage distribution in this and lower voltage portions of the winding, we have found a conductive static shielding plate disposed interiorly of the winding to be effective.

An interior static shielding plate is identified at FIG. 2 by the reference numeral 125. The plate 125 is formed of conductive material enclosed in an insulating sheet 126 and is disposed internally in the winding 111 between two adjacent coils 120 in that region of the winding at or close to the point of transition between the interlaced end group of coils and the adjacent non-interlaced group of coils. In the particular embodiment shown at FIG. 2, the interior static plate 125 is located between the 8th and 9th coils and thus partially within the non-interlaced group of coils 121. It will be understood however that the entire winding, shown only in fragmentary cross-sectional view at FIG. 2, includes a considerable number of additional non-interlaced coils between the location of the plate 125 and the grounded end of the winding. The static plate 125 is shown electrically connected to a high voltage end terminal 130 of the winding 111 by means of a conductor 131. Alternatively a conductor 132, shown in dotted lines, indicates, that if desired, the static plate 125 may be connected to a lower voltage interior portion of the winding, preferably within the end group of interlaced coils 120. The plate 125 should in any event be connected to a point in the series circuit through the winding 111 which is at a higher electric potential than are the coils 120 or 121 between which the plate is interposed. The conductor 132 is shown connected to the series connection 133 at the point of transition between interlaced and non-interlaced coils. It is preferable that connection of the plate 125 be made at some point between the line terminal 130 and the series connection 133, these end points being included in the specified region.

The location of such a static plate 125 at or electrically proximate the point of transition between the interlaced end coils 120 and the non-interlaced interior coils 121 is believed to have the effect of adding series capacitance to the winding at this critical transition point in such a way that the coil-to-coil and turn-to-turn voltage gradient in this region is reduced. The electrostatic field established by the static plate 125 is substantially uniform in a region at both sides of the plate and tends to bring about a uniform voltage gradient between conductors located in this electrostatic field. This shielding effect of the static plate is not needed among the interlaced coils, since in this region of the winding the interlacing itself brings about a nearly uniform voltage distribution. For this reason, therefore, it is desirable to insert the static plate at a position in the winding near the point of transition between the interlaced and the non-interlaced coils, but slightly into the non-interlaced portion of the winding so that the full shielding effect at both sides of the interior static plate may be utilized to greater advantage. It will be understood that in practice it is desirable to insert the interior static plate 125 either at the point of transition between the interlaced and non-interlaced coils or on the low voltage side of this transition point only to the extent that the non-interlaced coils between the transition point and the static plate are shielded effectively by the electrostatic field effect of the plate.

At FIG. 2 we have shown also a second static plate 134 encased in an insulating sheath 135 and located axially beyond the end coils 120 at the high voltage end of the winding. The static plate 134 is connected to the high voltage line terminal 130, and has an end shielding effect upon the winding well known to those skilled in the art.

By way of illustrating the beneficial effect of our invention upon impulse voltage distribution throughout the high voltage winding 111, we have shown at FIG. 3 a series of voltage distribution curves in which the ordinant of each curve is the percent of initially applied instantaneous voltage, and the abscissa is in winding location where such voltage appears in terms of percentage of total turns measured from the low voltage grounded end. The curve A of FIG. 3 illustrates the initial instantaneous voltage distribution which would appear throughout the distributed parallel and series capacitance of a typical winding if the inductance were absent. It will be understood of course that when a steep wave front impulse is initially applied to the winding this theoretical condition is approximated because the very high inductive reactance substantially prevents any instantaneous flow of current through the coils of the winding. It will be noted from curve A, for example, that substantially the entire voltage drop takes place in the first 25% of turns at the high voltage end of the windings, and that about 60% of the voltage drop takes place in the first 5% of the winding of the high voltage end. In the past this extremely unfavorable voltage distribution shown at curve A has been modified to some extent by adding series capacitance to a winding, for example, in the form of the so-called rib shields shown in Patent 2,279,028, Weed. At curve B of FIG. 3 we have shown a typical voltage distribution curve for a high voltage winding provided with such rib shields. While the voltage gradient of curve B at the high voltage end of the winding is still quite severe, it is appreciably improved. It will be understood, of course, that if the winding consisted solely of series capacitance or solely of inductance, the voltage distribution along the winding would be represented by the linear curve C of FIG. 3.

The effect of our invention is illustrated at curve D of FIG. 3. The upper, substantially linear portion of the curve approaches the theoretical linear curve C and is produced by increasing in approximately 10 or 12 percent of the coils adjacent the high voltage line end of the winding. At the point of transition (T) between the interlaced coils and the non-interlaced coils, the curve D abruptly assumes substantially the same configuration as the curve B. While the gradient of curve D below point T is steep, this gradient occurs only in portions of the winding exposed to considerably less than maximum voltage to ground. For this reason electrostatic stress in the main gap is diminished and the gap may be made narrower even though coil-to-coil voltage gradients are still large.

While we have described only a preferred embodiment of our invention by way of illustration, many modifications will occur to those skilled in the art, and we therefore wish to have it understood that we intend in the appended claims to cover all such modifications as fall within the true spirit and scope of our invention.

What we claim as new and desire to secure by Letters Patent of the United States is:

1. An inductive winding for electrical apparatus having at least one high voltage end portion provided with a terminal and comprising, a plurality of coaxially disposed annular coils spirally wound in the same rotational direction alternately radially outward and radially inward and connected in series circuit relation, a first group of said coils at said high voltage end portion of said winding being each formed of a plurality of radially interleaved spiral conductors electrically connected in series circuit relation and a second group of said coils being each formed of a single spiral conductor, an electrically conductive static plate interposed between adjacent coils of said winding in the region of the series connection between said groups of coils, and means electrically connecting said plate to said winding at a point between said high voltage terminal and said adjacent coils.

2. An inductive winding according to claim 1 wherein said static plate is disposed within said second group of coils in proximate juxtaposition with said first group of coils and is connected electrically to said winding at a point between said high voltage terminal and said series connection.

3. An inductive winding according to claim 1 wherein said static plate is disposed substantially at the point of series transition between said first and second groups of coils and is connected electrically to a point of higher electrical potential on said winding.

4. An inductive winding according to claim 2 wherein said static plate is electrically connected directly to said high voltage terminal.

5. A high voltage inductive winding for electrical apparatus comprising a high voltage terminal at one end, a first group of annular coils connected in series circuit relation directly to said one end terminal and coaxially disposed in side-by-side relation, said coils being wound alternately radially inward and radially outward in the same rotational direction and each including a plurality of laterally juxtaposed conductors spirally wound together with their turns in mutual radially interposed relation, means connecting the juxtaposed conductors of each said coil in series circuit relation, a second group of annular coils connected in series circuit relation with said first group of coils and coaxially disposed in side-by-side relation adjacent said first group, each coil of said second group being formed of a single spirally wound conductor and said coils being wound alternately radially inward and radially outward in the same rotational direction, an electrically conductive static plate interposed between adjacent coils in the region of the series connection between said groups of coils, and means electrically connecting said static plate to said winding at a point electrically displaced from said series connection towards said end terminal.

6. An inductive apparatus according to claim 5 wherein the oppositely wound end pair of coils and successive oppositely wound pairs of coils in said first group are serially connected with the several conductors of each said pair of coils alternately in series circuit relation.

7. An inductive winding according to claim 6 wherein said static plate is disposed within said second group of coils in proximate juxtaposition with said first group of coils and is connected electricaly to said winding at a point between said end terminal and said series connection.

8. An inductive winding according to claim 5 wherein the coils in said first group are serially connected with the several conductors of each coil electrically separated by at least one serially interposed conductor of another coil in said first group and said static plate is disposed within said second group of coils in proximate juxtaposition with said first group of coils.

9. An inductive winding according to claim 8 wherein said static plate is electrically connected to said high voltage end terminal.

10. An inductive winding for electrical apparatus comprising a pair of end terminals adapted to be connected to a source of electric current supply having at least one side at high voltage, a first group of annular coils connected in series circuit relation directly to a high voltage winding terminal and coaxially disposed in side-by-side relation, said coils being wound alternately radially inward and radially outward in the same rotational direction and each including $n$ laterally juxtaposed conductors spirally wound together with their turns in mutual radially interposed relation, means connecting the juxtaposed conductors of each set of $n$ coils in said first group in a series circuit relation repetitively traversing said set of $n$ coils, a second group of annular coils connected in series circuit relation with said first group of coils and coaxially disposed in side-by-side relation adjacent said first group, each coil of said second group being formed of a single spirally wound conductor and said coils being wound alternately radially inward and radially outward in the same rotational direction, a first electrically conductive static plate connected to said high voltage terminal and disposed adjacent the juxtaposed high voltage end of said winding, a second electrically conductive static plate interposed between adjacent coils in the region of the series connection between said groups of coils, and means electrically connecting said second static plate to said winding at a point in electrical proximity to said high voltage terminal.

References Cited

UNITED STATES PATENTS

| | | | |
|---|---|---|---|
| 2,155,840 | 4/1939 | Rorden | 336—70 |
| 2,374,049 | 4/1945 | Stephens | 336—69 X |
| 3,246,270 | 4/1966 | Stein | 336—70 |

FOREIGN PATENTS

| | | |
|---|---|---|
| 819,039 | 10/1937 | France. |
| 641,915 | 7/1962 | Italy. |

DARRELL L. CLAY, *Primary Examiner.*

L. H. MYERS, *Examiner.*

T. J. KOZMA, *Assistant Examiner.*